United States Patent

Terry et al.

[15] 3,700,032

[45] Oct. 24, 1972

[54] METHOD FOR FRACTURING SUBTERRANEAN FORMATIONS

[72] Inventors: William M. Terry, Houston; John W Graham, Alvin; Albert R. Sinclair; Othar M. Kiel, both of Houston, all of Tex.

[73] Assignee: Esso Production Research Company

[22] Filed: Dec. 16, 1970

[21] Appl. No.: 98,525

[52] U.S. Cl. .................................166/283, 166/308
[51] Int. Cl. ..........................................E21b 43/26
[58] Field of Search...166/283, 282, 308; 252/8.55 A

[56] References Cited

UNITED STATES PATENTS

| | | | |
|---|---|---|---|
| 3,046,222 | 7/1962 | Phansalker | 166/283 |
| 2,965,172 | 12/1960 | Da Roza | 166/308 |
| 2,779,735 | 1/1957 | Brown | 252/8.55 |
| 3,500,929 | 3/1970 | Eilers | 166/295 |

OTHER PUBLICATIONS

Composition and Properties of Oil Well Drilling Fluids, Rogers Third Edition, 1963, p. 664.

*Primary Examiner*—Robert L. Wolfe
*Attorney*—James A. Reilly, John B. Davidson, Lewis H. Eatherton, James E. Gilchrist, Robert L. Graham and James E. Reed

[57] ABSTRACT

A fracturing method wherein a fluid containing particles of petroleum coke are injected into a subterranean formation at a pressure sufficient to open a fracture therein.

6 Claims, 3 Drawing Figures

METHOD FOR FRACTURING SUBTERRANEAN FORMATIONS

BACKGROUND OF THE INVENTION

1. Field of the Invention

The present invention relates to hydraulic fracturing of subterranean formations surrounding oil wells, gas wells, water wells, injection wells, and similar boreholes.

2. Description of the Prior Art

Hydraulic fracturing is a widely used well stimulation technique designed to increase the productivity of a well by creating fractures in the formation surrounding the wellbore. The technique normally involves two basic steps: (1) injecting a fluid into the formation at a rate and pressure sufficient to open a fracture therein, and (2) placing propping agent particles in the fracture to maintain it in a propped condition when the applied pressure is relieved.

During the propagation step of the treatment, the fracturing fluid must have properties such to produce a wedging effect on the formation. These properties relate to the fluid loss characteristic and viscosity of the fluid employed as the fracturing medium.

It has long been known that the fluid efficiency of a fracturing fluid must be high if fractures of reasonable lengths and widths are to be obtained. Fluid efficiency, as used in fracturing operations, is defined as the percent of injected fluid which remains within the fracture, and is a measure of the fluid loss characteristic of the fluid. Many fluids tend to leak off rapidly into the formation matrix and therefore provide low fluid efficiencies. The fluid efficiency can be improved by the addition of fluid loss control additives which are generally in the form of finely divided materials. The particle size of the bulk material is sufficiently small to enter the fracture and plug or cover the pores of the exposed formation. Thus as the fluid leaks off into the formation matrix, the particles screen out on the exposed wall forming a filter cake thereon. The effectiveness of a particular additive can be measured in terms of its ability to form the filter cake and the quality of the filter cake.

Silica flour was one of the earliest fluid loss control additives and, although a variety of other materials have since been proposed, remains by far the most widely used. Silica flour is finely ground silica sand having a particle size of about 325 mesh on the U.S. Sieve Scale. Silica flour is readily available and, when used in conjunction with a water-dispersible gum such a guar gum, achieves satisfactory fluid loss control. However, the material is relatively expensive particularly when considering that the typical fracturing treatment requires about 1,000 pounds per job. Moreover, silica flour has a high density which makes it difficult to suspend in low gel systems. Silica flour is also a highly abrasive material and therefore can damage subsurface and surface equipment if produced along with formation fluids when the well is placed on production.

SUMMARY OF THE INVENTION

The present invention provides a new fracturing method employing an improved fracturing fluid. Briefly, the method comprises the steps of injecting into a subterranean formation surrounding a wellbore, a fluid having suspended therein particles of petroleum coke; applying sufficient pressure to the fluid to open a fracture in the formation; and thereafter producing from the formation. The petroleum coke preferably should have a wide particle size distribution, the largest particles being smaller than 100 mesh and the smallest particles smaller than 400 mesh on the U.S. Sieve Scale. The major volume proportion of the particles should be smaller than 200 mesh. The concentration of the suspended petroleum coke can range from about 5 to about 100 pounds per 1,000 gallons of fluid, with the preferred range being from 10 to 40 pounds per 1,000 gallons of fluid.

The petroleum coke particles, preferably, should be used in a fluid containing a gelling agent such as an oil-soluble or water-soluble polymer. The polymer serves as a plastering agent for the coke particles and improves the quality of the filter cake. In water base systems, the gelling agent can be any one of the natural or synthetic gums.

Petroleum coke is a granular, carbonaceous residue remaining from the destructive distillation of crude petroleum. The distillation process known as coking is used for converting heavy residual bottoms of crude oil to low boiling petroleum products, with coke being a by-product. The two coking processes in commercial use today are delayed coking and fluid coking.

For use as a fluid loss control additive in fracturing operations, the coke must be in a particulate form and must have a particle size sufficiently small to enter the fracture and plug the formation pores. Since coke prepared by the fluid coking process is in particulate form as discharged from the coking unit, it can be rendered usable in the present invention by merely processing the material to obtain the particles of the desired size distribution range. This can be achieved by screening, by passing the material through cyclone separators, or by grinding the bulk material.

The finely divided petroleum coke exhibits properties which makes it ideal for the contemplated service. It has a relatively low specific gravity (0.9 – 1.3) which permits it to be easily suspended in both oil-base and water-base fluids; it has sufficient structural strength to lodge and cover the formation pores; the particles are nonabrasive and therefore will not damage subsurface and surface equipment if produced; it is available in abundant supply at a very low cost; and it is inert to most fluids and therefore can be used in acid solutions.

Laboratory tests indicate that fluid coke at certain weight concentrations offers somewhat better fluid loss control over equal weight concentrations of silica flour. The improved results are probably due to the higher volume concentration of the fluid coke. The density of fluid coke is approximately one-half that of silica flour; thus for equal weight concentrations, fluid coke provides about twice as much volume as silica flour.

DESCRIPTION OF THE PREFERRED EMBODIMENTS

Figure 1:
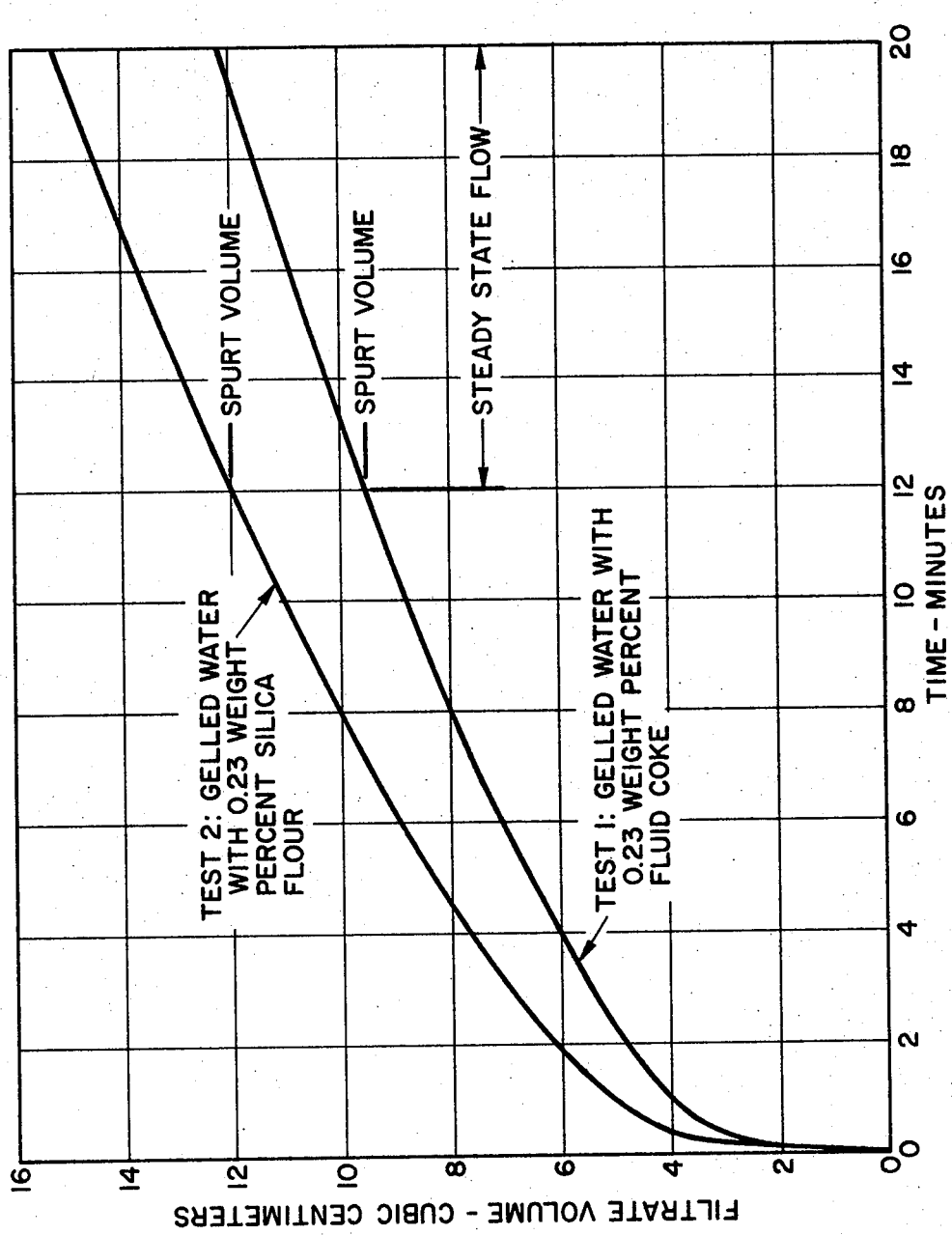
FIGS. 1, 2 and 3 are plots comparing the performance of fluid coke and silica flour as fluid loss control additives in a water-base fluid.

Following the completion of an oil well or gas well, it is frequently necessary to increase the productivity of the producing formation. This can be done by one of many stimulating techniques currently used in the petroleum industry. The most common well stimulation is a technique known as hydraulic fracturing which is performed by injecting a fracturing fluid into the formation at a pressure sufficient to open a fracture therein. The earth stresses are generally such that the fracture is oriented in a vertical plane extending outwardly from the wellbore in diametric directions. Continued injection of the fluid at high rates causes the fracture to grow in length and width. Once a fracture of the desired geometry is obtained, propping agent particles suspended in a carrier fluid are deposited in the fracture to maintain it in a propped condition when the injection pressure is relieved. The degree of stimulation afforded by the fracturing treatment is a function of the length and width of the propped fracture.

In order to provide the proper fracture geometry, the fluid must have a low leak-off rate into the formation. Adequate control of the leak-off rate is an important property of the fracturing fluid since fluid that enters the fracture must maintain the wedging effect to propagate the fracture. To accomplish this, a reasonable percentage of the fluid entering the fracture must remain within the fracture. The smaller the percentage of fluid leak-off, the more efficient the system becomes, thereby creating more fracture per unit volume of fluid injected.

Water-base fluids generally exhibit a high leak-off rate. Fluid loss control additives in the form of finely divided, inert materials are therefore commonly used to improve the fluid loss character of water-base fluids. These materials are usually used in a system containing a water-dispersible gum, such as guar gum. The fluid loss control is a function of the system's ability to form a filter cake on the fracture wall. The particles serve to plug or close the pores of the exposed formation and the guar gum aids in forming a continuous filter cake plastered against the fracture wall.

Laboratory tests have shown that fluid leak-off into the formation matrix follow three characteristic phases. Initially the fluid containing the fluid loss control additive enters the fracture and leaks off into the formation matrix as though no additive were present. During this phase, the leak-off rate is controlled by the formation properties. As the fluid leaks off into the formation, the particles aided by the gelling agent begin building a filter cake on the formation wall. The leak-off rate during this second phase is a function of both the formation properties and filter cake permeability. The filter cake continues to grow in thickness until a steady state, or constant, thickness is attained. Further growth of the filter cake thickness is inhibited because of the erosion effects of the fluid stream passing through the fracture. Fluid leak-off through the steady state filter cake is a function of only the filter cake permeability. The leak-off rate is referred to as steady state leak-off and can be expressed by the following equation:

$$V = (\Delta P)/(\mu (L/K))$$

wherein $V$ is the steady state leak-off velocity;

$\Delta P$ is the total pressure difference across the filter cake;

$\mu$ is the viscosity of the fracturing fluid; and $(L/K)$ is the ratio of thickness of the filter cake to cake permeability.

From the above equation, it can be seen that the parameter relating to a filter cake property is the ratio $L/K$. The fluid loss control additive, ideally, should provide high values for $L/K$. Tests have shown that the $L/K$ property of the filter cake can be improved somewhat by increasing the concentration of the additive in the fluid.

As indicated above, the fluid loss control additive does not exercise full control of the leak-off rate until the steady state filter cake has been formed. The volume of fluid leak-off into the formation matrix prior to attainment of the steady state condition is referred to in the art as "spurt volume." An important function of the fluid loss control additive is to reduce the spurt volume to a low value so as to permit more efficient application of the fluid injected into the formation.

A low spurt volume indicates the ability of the fluid loss control additive to build a steady state filter cake in a relatively short period of time.

Thus, the effectiveness of a fluid loss control additive for use in a fracturing fluid is the material's ability to reduce both the spurt volume and the steady state leak-off rate.

As mentioned earlier, the method of the present invention employs a fluid loss control additive composed of finely divided petroleum coke. Laboratory tests indicate that petroleum coke at certain concentrations is somewhat more effective in reducing spurt volume and steady state leak-off rate than an equal weight concentration of silica flour. The reason for the improvement, albeit slight, is believed to be due to the lower density of the petroleum coke particles. Fluid coke provides a higher volume concentration in the fluid than an equal weight concentration of silica flour. Petroleum coke exhibits other properties which make it far superior to silica flour in the contemplated fracturing service. Petroleum coke has a specific gravity between about 0.9 and 1.3, making it easily suspended in most water-base and oil-base fluids. In contrast, silica flour, which has a specific gravity between of about 2.6, is difficult to suspend, particularly in ungelled fluids. Petroleum coke is a brittle material which is easily here fragmented and exhibits no abrasive qualities. Silica flour, on the other hand, is a highly abrasive material and when produced along with formation fluids following a fracturing treatment, can erode subsurface and surface facilities, particularly when carried in high velocity gas. Petroleum coke, being a by-product, is available in abundant supply at a bulk cost of about one-eighth that of silica flour. Petroleum coke is inert material and therefore can be used in most fluids, including all types of acids used in fracturing operations. Silica flour is inert to most fluids but is subject to attack by certain acids used in fracturing operations.

Petroleum coke usable in the method of the invention can be obtained as a by-product from the two current coking processes: (1) delayed coking, and (2) fluid coking. The by-product of delayed coking process is generally not in particulate form and therefore must be processed to reduce it to particles of the proper size distribution. This can be done by grinding techniques well known in the art.

The petroleum coke by-product of the fluid coking process is referred to as fluid coke. Because of its particulate form as discharged from the refinery, this material can be more economically adapted to the contemplated service than the coke produced by the delayed coking process. For this reason, fluid coke is a preferred material in the practice of the present invention. In the fluid coking process, coke is continuously withdrawn from the coking system in order to keep the solids content of the system at a constant level. The particle size of the coke discharged from the fluid coking system generally ranges from about 50 mesh to less than 400 mesh size. This aggregate material is generally passed through cyclone separators for segregating the fines from the larger particles. The bulk of the material, in the size range from about 50 to 200 mesh and the fines are then conveyed to separate storage locations. Although the purpose for separating the fines from the bulk material is to improve the ease of handling the bulk material, it has been found that the size distribution of the fines is such to permit the use of the material as a fluid loss control additive in fracturing operations. The fact that these fines can be used with a minimum of preparation expenses results in extremely low priced additive, particularly when compared to the cost of the commercially available fluid loss control additives.

The bulk material, that is the material free of the fines, can also be used as a fluid loss control additive with a minimum of processing. A sample of the bulk fluid coke exhibited the following properties:

Particle density, grams per cubic centimeter: 1.3
Carbon, weight percent: 90.0
Sulfur, weight percent: 5.0
Ash, weight percent: 0.3
Metal, weight percent: 0.1
Particle size distribution, mesh: 50–200

The proper size distribution of the bulk fluid coke can be obtained by passing the petroleum coke through screens, through cyclone separators or by conventional grinding techniques.

The particle size distribution of the petroleum coke can vary within a relatively wide range, which will depend somewhat on the permeability of the formation to be treated. Preferably, the largest particles should be no larger than the 100 mesh and the major proportion of the particles should be smaller than the 200 mesh on the U.S. Sieve Scale. For high permeability formations — that is greater than 100 millidarcies — the average particle size should be somewhat larger.

The concentration of the finely divided coke in the fluid will depend, in part, on the permeability of the formation to be fractured. For most applications, however, concentrations between about 5 and about 40 pounds per 1,000 gallons should be sufficient.

As mentioned above, the system generally will require a gelling agent, the main function of which is to enhance the ability of the system to build a filter cake on the fracture wall. In the method of the present invention, the concentration of the gelling agent can be somewhat reduced over that used in connection with silica flour. When employing silica flour as a fluid loss control additive, the system must contain a gelling agent in order to suspend the heavy silica flour. Without the gelling agent, a great deal of the silica flour would settle in the water and would not reach distant areas in the fracture. In the present system, the main function of the gelling agent is to serve as a plastering agent for the fluid coke particles in forming the filter cake on the fracture wall. In water-base systems, the gelling agent can be any one of a wide variety of materials that can be dissolved or dispersed in water to give a viscous solution or dispersion. The natural gums, such as guar gum, arabic, tragacanth, karaya, and the like can be used. Also usable are the cellulose derivatives such as carboxymethylcellulose, methylcellulose and the like. Synthetic polymers also serve satisfactorily as gelling agents, the most common of which are the vinyl polymers, acrylic polymers, and the like. At the present, guar gum is the most common gelling agent used as a filter cake building material. The concentration of guar gum can range between 10 and 100 pounds per 1,000 gallons, with the range between about 10 and 40 pounds per 1,000 gallons being preferred.

Suitable gelling agents for hydrocarbon oil or other oil-base systems include polyisobutylene, polymethylmethacrylate, and certain aluminum soaps. High molecular weight polyisobutylene (viscosity average molecular weight of 2,000,000 or more) and a hydroxy aluminum soap known as "napalm" are particularly effective gelling agents for hydrocarbon oils. The concentration of the polyisobutylene can be between about 1 and about 25 pounds per 1,000 gallons of fluid; and the concentration of the napalm can be between about 20 pounds and more than 100 pounds per 1,000 gallons of fluid. The coke particles can also be used in combination with gelatinous materials such as sodium caproate, sodium oleate, sodium stearate, sodium dodecylbenzene sulfonate, and sodium pelargonate.

In a typical fracturing treatment using a water-base fluid, the fluid can contain 20 pounds of the fluid coke per 1,000 gallons of fluid and 20 pounds of guar gum per 1,000 gallons of fluid. The guar gum can be introduced prior to commencing injection operations and permitted to hydrolyze. During injection operations, the fluid coke can be blended into the stream by use of conventional blending equipment. The fluid containing the additives is pumped through the well conduit at a rate and pressure sufficient to open a fracture in the formation. Rates commonly employed in fracturing operations range between about 5 and 50 barrels per minute. After a fracture of the desired geometry has been generated, propping agent particles can be blended into the fluid and carried into the fracture. The most commonly employed proppant is a specially graded sand ranging between about 10 and 60 mesh in size. Other proppants include glass beads, steel shot, plastic pellets, walnut shells, and aluminum pellets. After the propping agent particles have been placed in the fracture, the well is shut in from about 8 to about 72 hours and then placed on production.

The following laboratory experiments illustrate the effectiveness of fluid coke in providing fluid loss control under dynamic flow conditions. Six tests were run using water base fluids containing either fluid coke or silica flour. The base fluid of each sample was tap water containing 0.23 weight percent of guar gum (equivalent to about 20 pounds per 1,000 gallons of fluid) and 3 weight percent of sodium chloride. The fluid coke and silica flour had particle size distributions shown in Table I.

TABLE I

| Mesh Size (U.S. Sieve Scale) | Fluid Coke (Weight Percent Retained) | Silica Flour (Weight Percent Retained) |
| --- | --- | --- |
| 100 | 0.1 | 3.2 |
| 120 |  | 2.5 |
| 140 |  | 0.5 |
| 170 | 8.0 |  |
| 200 |  | 0.7 |
| 230 | 6.2 |  |
| 270 |  | 45.7 |
| 325 | 7.0 | 26.2 |
| 400 | 0.1 |  |
| Pan | 78.7 | 21.2 |

Figure 2:
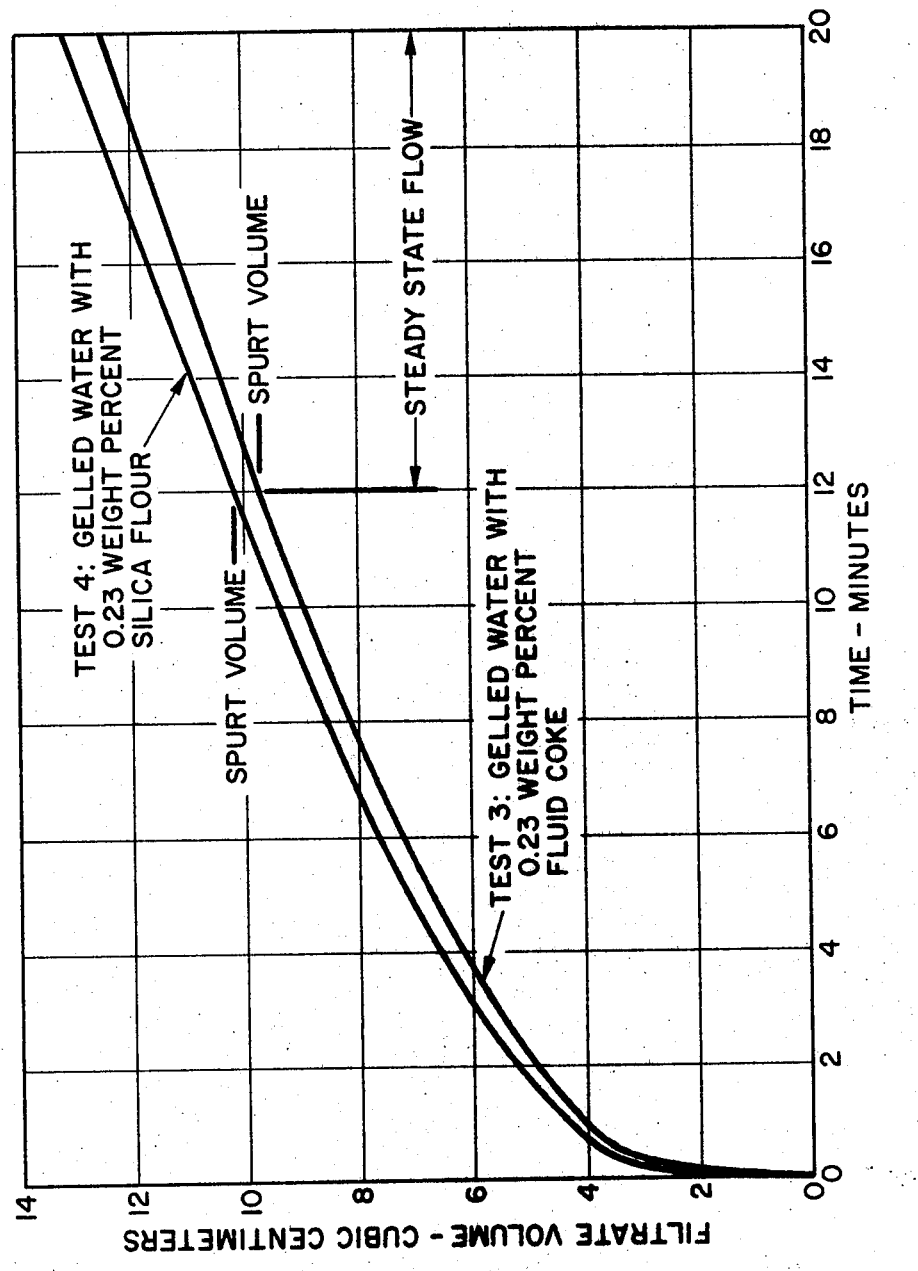
Figure 3:
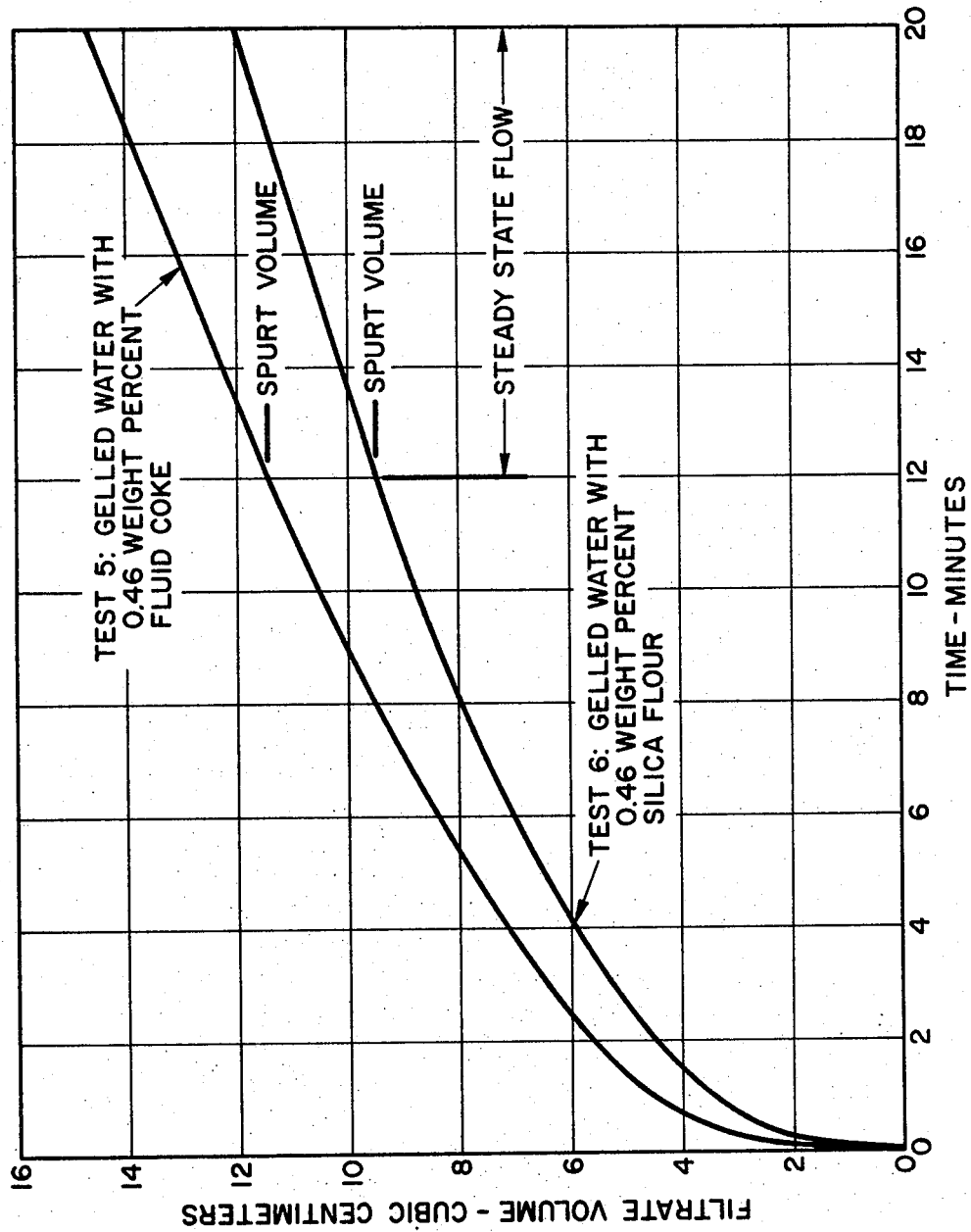

The apparatus for performing the dynamic fluid loss tests consisted of a holder adapted to receive a core 2 inches in diameter and one-half inch in length. The holder was shaped to expose a circular face of the core. The fluid was flowed past the exposed face at a velocity of 60 feet per minute. A differential pressure across the core was maintained at 1,000 psig. The filtrate filtering through the core was collected in a graduated cylinder and the filtrate volume was recorded at preselected time intervals. The cores used in all tests were Bandera cores having a permeability of about 2 millidarcies. The fluid loss data obtained from the tests were used to prepare the curves shown in FIGS. 1, 2 and 3. From these curves, it is possible to determine (1) spurt volume and (2) steady state leak-off rate. The spurt volume theoretically is the volume of filtrate collected prior to the onset of steady state conditions which occurs when the filter cake reaches a constant thickness. This condition is reflected by the straight line portion of the curve. The character of all of the curves indicate that the steady state condition prevailed after about 12 minutes of filtration. For purposes of comparison, the spurt volume in all the tests were determined at the 12 minute point and the steady state leak-off rate was determined by the slope of the curve after the 12 minute point. The spurt volume and steady state leak-off rates for each test are tabulated in Table II.

TABLE II

| Test | Fluid | Additive | Additive Concentration (wt. %) | Spurt Volume (cc) | Steady State Leak-Off (cc/min) |
| --- | --- | --- | --- | --- | --- |
| 1 | gelled water | fluid coke | 0.23 | 9.5 | 3.4 |
| 2 | gelled water | silica flour | 0.23 | 12.0 | 4.0 |
| 3 | gelled water | fluid coke | 0.23 | 9.7 | 3.4 |
| 4 | gelled water | silica flour | 0.23 | 10.1 | 3.7 |
| 5 | gelled water | fluid coke | 0.46 | 11.4 | 4.0 |
| 6 | gelled water | silica flour | 0.46 | 9.5 | 3.1 |

As reflected by the data appearing in Table II, fluid coke provides improved fluid loss control in gelled water at the lower weight concentration (0.23 weight percent). At the higher weight concentration (0.46 weight percent), the silica flour performed better than fluid coke. The reasons for the anomalous results are not understood. However, the fact that the higher concentration of fluid coke provided less fluid loss control than the lower concentration of fluid coke indicates that the mechanisms involved may be unrelated to the quality of the filter cake. From these tests, however, it can be concluded that fluid coke is at least as effective as silica flour in controlling fluid loss in gelled water. It again should be emphasized that the principal advantages of fluid coke over silica flour in the fluid loss control service are due to the fluid coke's suspendability, low abrasive quality, inertness, and low cost.

We claim:

1. A method for the hydraulic fracturing of a subterranean formation surrounding a wellbore which comprises injecting into said formation a liquid containing, in a concentration of from 5 to 100 pounds per 1,000 gallons of said liquid, suspended particles of fluid coke, substantially all of said particles being smaller than 100 mesh in size based on the U.S. Sieve Scale.

2. The method as recited in claim 1 wherein the said liquid is an aqueous liquid.

3. The method as recited in claim 1 wherein said liquid is a hydrocarbon oil.

4. The method as recited in claim 2 wherein the aqueous liquid further contains a water-dispersible gum.

5. The method as recited in claim 4 wherein the water-dispersible gum is guar gum and is present in a concentration of at least 10 pounds per 1,000 gallons of said aqueous liquid.

6. The method as recited in claim 1 wherein a major portion of the particles of fluid coke are smaller than 200 mesh in size based on the U.S. Sieve Scale.

* * * * *